US012138608B2

(12) United States Patent
Molinie

(10) Patent No.: US 12,138,608 B2
(45) Date of Patent: Nov. 12, 2024

(54) CONDITIONING AND APPLICATION DEVICE FOR A BIPHASIC FLUID COSMETIC

(71) Applicant: L'OREAL, Paris (FR)

(72) Inventor: Jordan Molinie, Clichy (FR)

(73) Assignee: L'OREAL, Paris (FR)

( * ) Notice: Subject to any disclaimer, the term of this patent is extended or adjusted under 35 U.S.C. 154(b) by 294 days.

(21) Appl. No.: 17/640,904

(22) PCT Filed: Sep. 11, 2020

(86) PCT No.: PCT/EP2020/075456
§ 371 (c)(1),
(2) Date: Mar. 7, 2022

(87) PCT Pub. No.: WO2021/048340
PCT Pub. Date: Mar. 18, 2021

(65) Prior Publication Data

US 2022/0369788 A1 Nov. 24, 2022

(30) Foreign Application Priority Data

Sep. 11, 2019 (FR) ...................................... 19 09997

(51) Int. Cl.
*B01F 35/32* (2022.01)
*B01F 23/411* (2022.01)
(Continued)

(52) U.S. Cl.
CPC .... *B01F 35/32021* (2022.01); *B01F 23/4111* (2022.01); *B01F 31/42* (2022.01);
(Continued)

(58) Field of Classification Search
CPC .......... A45D 2200/058; A45D 2200/05; B01F 33/50111; B01F 31/42; B01F 35/32021;
(Continued)

(56) References Cited

U.S. PATENT DOCUMENTS 4,003,555 A * 1/1977 Swartz .................... A47J 43/27
D7/300.1
4,916,672 A 4/1990 McCrory
(Continued)

FOREIGN PATENT DOCUMENTS

CN 202820048 U 3/2013
DE 1073166 B 1/1960
(Continued)

OTHER PUBLICATIONS

Search Report dated Jun. 30, 2020 in French Priority Application 19 09997.

*Primary Examiner* — David J Walczak
(74) *Attorney, Agent, or Firm* — POLSINELLI PC

(57) ABSTRACT

Disclosed is a device (10) for conditioning and applying a biphasic fluid cosmetic composition, comprising a receptacle (12) extending along a main axis and defining an internal volume (30) able to receive the cosmetic composition, the receptacle comprising a neck (26) giving access to the internal volume; and a mixing member (42), received in the internal volume of the receptacle, wherein the mixing member includes a plurality of extended filaments (60), a first end (62) of each one of the filaments is connected to the neck of the receptacle, with the filaments being separated from each other by a non-zero distance (66) over at least 50% of a height (34) of the internal volume from the neck; and the mixing member is fixed in rotation with respect to the receptacle.

14 Claims, 4 Drawing Sheets

(51) Int. Cl.
*B01F 31/42* (2022.01)
*B01F 33/501* (2022.01)
*B01F 101/21* (2022.01)

(52) U.S. Cl.
CPC .. *B01F 33/50111* (2022.01); *A45D 2200/058* (2013.01); *B01F 2101/21* (2022.01)

(58) Field of Classification Search
CPC .............. B01F 23/4111; B01F 2101/21; B01F 33/5011; B01F 35/3202
USPC .......................... 401/4, 40–43; 366/130, 242
See application file for complete search history.

(56) References Cited

U.S. PATENT DOCUMENTS

| | | | |
|---|---|---|---|
| 5,172,992 | A | 12/1992 | Ackermann |
| 7,931,140 | B2 | 4/2011 | Heidenreiter |
| 9,295,316 | B2 | 3/2016 | Mathiez |
| 2010/0284243 | A1 | 11/2010 | Umsonst-Kübler |
| 2013/0279287 | A1 | 10/2013 | Cerasani |
| 2017/0105579 | A1 | 4/2017 | Severino |
| 2017/0173544 | A1 | 6/2017 | Laby |
| 2017/0311698 | A1 | 11/2017 | Miller |
| 2020/0353429 | A1 * | 11/2020 | Parks ................ B01F 35/32021 |

FOREIGN PATENT DOCUMENTS

| | | | |
|---|---|---|---|
| JP | H 0733879 | U | 6/1995 |
| KR | 20180026436 | A | 3/2018 |
| TW | 201904473 | A | 2/2019 |
| WO | 2012096990 | A2 | 7/2012 |
| WO | 2012143646 | A1 | 10/2012 |
| WO | WO 2018/222447 | A2 | 12/2018 |

* cited by examiner

CONDITIONING AND APPLICATION DEVICE FOR A BIPHASIC FLUID COSMETIC

CROSS REFERENCE TO RELATED APPLICATIONS

This application is a National Phase filing under 35 U.S.C. § 371 of PCT/EP2020/075456 filed on Sep. 11, 2020; which application in turn claims priority to Application No. 19 09997 filed in France on Sep. 11, 2019. The entire contents of each application are hereby incorporated by reference.

This invention relates to a device for conditioning and applying a biphasic fluid cosmetic composition, comprising: a receptacle extending along a main axis and defining an internal volume able to receive said cosmetic composition, said receptacle comprising a neck disposed on the main axis and giving access to said internal volume; and a mixing member, received in the internal volume of the receptacle.

The term "cosmetic composition", refers, according to this invention, to a product as defined in Regulation (EC) N° 1223/2009 of the European Parliament and of the Council of Nov. 30, 2009, on cosmetic products.

It is common to use biphasic cosmetic compositions, these compositions comprising two non-miscible phases, generally an aqueous phase and an oily phase.

The application of said cosmetic compositions requires beforehand mixing the two phases in the form of an emulsion. The latter must be of sufficient quality and stability to allow for a homogenous application of the two phases, for example on the skin or on keratin materials.

Generally, the emulsion of two phases of the composition is carried out by simple shaking of the receptacle before application. The emulsion obtained is generally optimal only after a substantial period of shaking, rendering the use of the product tedious.

It is known, in particular from document US2017/0311698 in the name of the Applicant, to provide the receptacle with a rotating mixing member. The rotation of said member inside the receptacle leads to the mixing of the composition.

Such movable mixing members complicate however the manufacturing as well as the use of the conditioning and application device.

The invention has for purpose to propose a device that is simple to produce and use, while still making it possible to easily emulsion a biphasic cosmetic composition before use.

To this effect, the invention has for object a conditioning and application device of the aforementioned type; wherein: the mixing member includes a plurality of extended filaments, a first end of each one of said filaments is connected to the neck of the receptacle, with the filaments being separated two-by-two by a non-zero distance over at least 50% of a height of the internal volume from said neck; the mixing member is fixed in rotation with respect to the receptacle; and the conditioning and application device further comprises a tip inserted into the neck of the receptacle, the first end of each one of the filaments of the mixing member being integral with said tip, said tip comprising at least one through-orifice giving access to the internal volume of the receptacle.

According to further advantageous aspects of the invention, the conditioning and application device comprises one or several of the following features taken in isolation or in any technically possible combination:

- the plurality of filaments comprises at least five filaments and preferably between 6 and 20 filaments;
- each filament has a substantially helical winding about the main axis;
- the mixing member further includes a head substantially disposed on the main axis, a second end of each of the filaments being integral with said head;
- the filaments define an envelope surface about the main axis, such that an intersection of said envelope surface with a plane passing through the main axis has a rounded profile;
- in a plane perpendicular to the main axis, a minimum distance between the envelope surface and the receptacle is greater than or equal to 10 mm;
- the mixing member further includes a substantially straight mast, connecting the head to the neck of the receptacle, the filaments being disposed around said mast;
- in a plane perpendicular to the main axis, a section of at list one filament has a substantially oval shape, a maximum dimension of said oval being oriented radially;
- the first ends of the filaments are disposed around the through-orifice or through-orifices;
- the conditioning and application device further comprises a biphasic fluid cosmetic composition received in an internal volume of the receptacle;
- the biphasic fluid cosmetic composition includes an aqueous phase and an organic phase, the aqueous phase representing between 50% and 99% by mass of said biphasic fluid cosmetic composition.

The invention will be easier to understand in view of the following description, provided solely as a non-restricted example and with reference to the drawings, wherein:

FIG. 1 shows a longitudinal section view of a conditioning and application device 10 according to a first embodiment of the invention.

Figure 1:
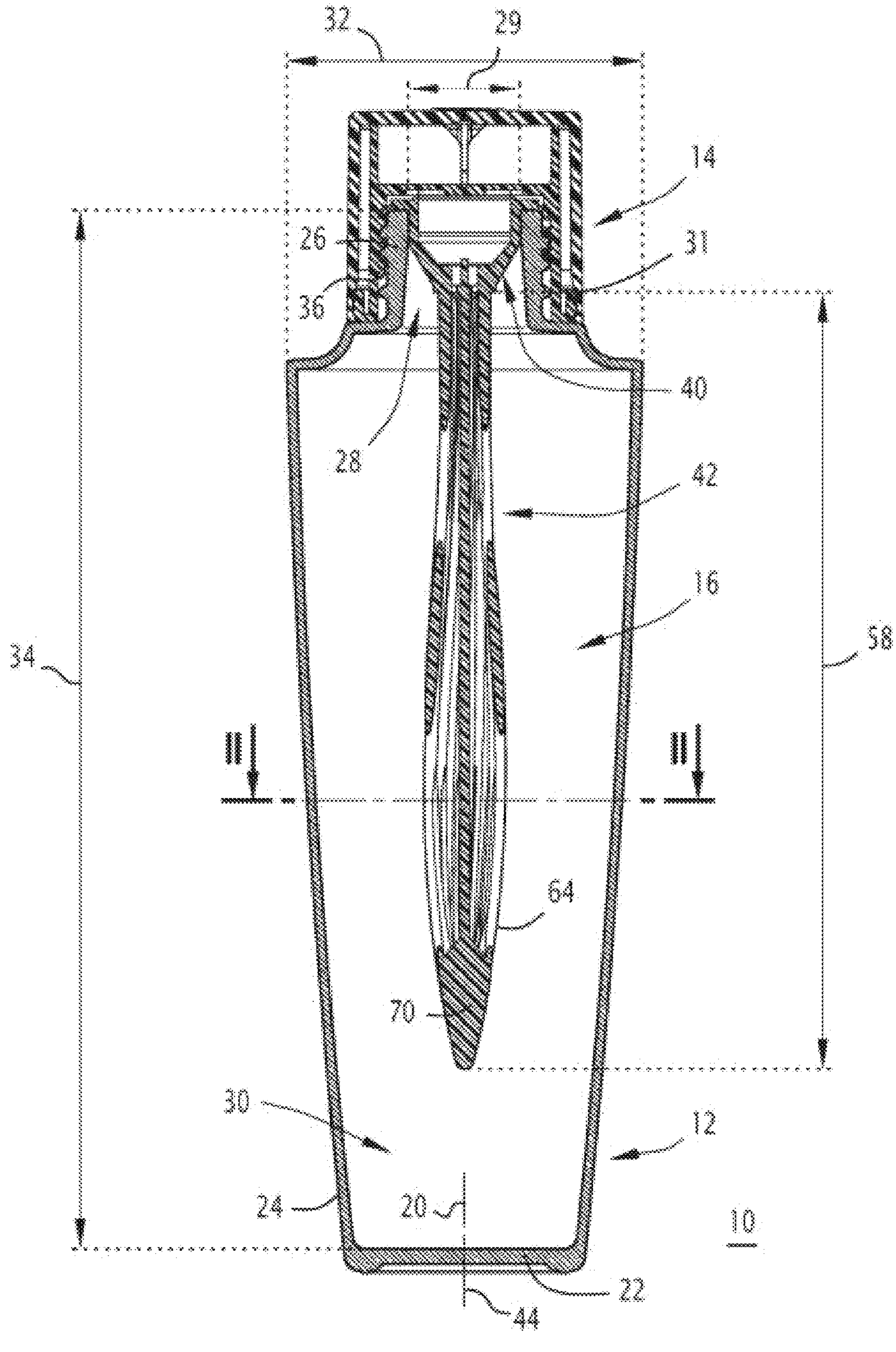
FIG. 1 is a longitudinal section view of a conditioning and application device according to an embodiment of the invention, comprising a mixing member.

The device 10 includes in particular a receptacle 12, a cover 14 and an insert 16.

The receptacle 12 extends along a first axis 20 and in particular includes a bottom 22, a side wall 24 and a neck 26, said neck materializing an upper opening 28. The neck 26 has in particular an inner diameter 29.

The receptacle 12 defines an internal volume 30, the upper opening 28 opening to said internal volume.

In the embodiment shown, the receptacle 12 substantially has a shape of revolution about the first axis 20, the upper opening 28 being in particular centered on said first axis.

The neck 26 preferably includes an assembly element 31 with the cover 14, such as a threading disposed on an outer wall of said neck.

Preferably, the receptacle 12 is formed from one piece. Preferably, the receptacle 12 is made from a transparent or translucent material, such as glass. The internal volume 30 is thus visible through the side wall 24.

The internal volume 30 preferably has an elongated shape. More precisely, a maximum transversal dimension 32 of the internal volume 30, perpendicularly to the first axis 20, is preferably less than or equal to 50% of a height 34 of the internal volume 30 along the first axis 20.

According to a preferred embodiment, the device 10 further comprises a biphasic fluid cosmetic composition received in the internal volume 30 of the receptacle 12. The term "fluid" means that the composition is liquid or viscous. The biphasic fluid cosmetic composition in particular includes an aqueous phase and an oily or organic phase, said two phases being non-miscible.

Preferably, the aqueous phase represents 50% and 99% by mass of said biphasic fluid cosmetic composition. In particular, the aqueous phase represents preferably at least 90%, more preferably at least 95% by mass of the biphasic fluid cosmetic composition. In a particular embodiment, the aqueous phase represents 97% by mass of the biphasic fluid cosmetic composition and the oily phase represents 3% by mass of the biphasic fluid cosmetic composition.

The mixing device 10 according to the invention is particularly suited to the mixing and the emulsion of aqueous and oily phases that have a respective viscosity, in other words a specific viscosity that is relatively low, in particular less than or equal to 20 mPa·s (milliPascal second).

The viscosities of the aqueous and oily phases of the biphasic fluid cosmetic composition are measured separately, using a RHEOMAT RM180 viscometer. The measurements are taken after sitting for 24 hours at ambient temperature (25° C.) using the spindle M1 provided with the measurement apparatus. The measurements are taken at controlled ambient temperature (25° C.). The viscosity of the aqueous and oily phases of the biphasic fluid cosmetic composition was analyzed at $T_0$=30 seconds and at $T_{10}$=10 minutes of stirring.

Preferably, the aqueous phase of the biphasic fluid cosmetic composition has a viscosity at $T_0$=30 seconds less than 5 mPa·s (milliPascal second), in particular comprised between 1 mPa·s and 2.5 mPa·s, and in particular close to 1.6 mPa·s, and a viscosity at $T_1$=10 minutes less than 4 mPa·s, in particular comprised between 1 mPa·s and 2 mPa·s, and in particular close to 1.2 mPa·s.

Preferably, the oily phase of the biphasic fluid cosmetic composition has a viscosity at $T_0$=30 seconds less than 20 mPa·s (milliPascal second), in particular comprised between 6 mPa·s and 16 mPa·s, and in particular close to 11 mPa·s. The viscosity at $T_{10}$=10 minutes of the oily phase of the biphasic fluid cosmetic composition is substantially identical to its viscosity at $T_0$=30 seconds.

The viscosity of the biphasic fluid cosmetic composition in the emulsified state, with the aqueous and oily phases emulsified, has a viscosity less than the viscosity of the most viscous phase of the composition, namely the oily phase.

The biphasic fluid cosmetic composition is preferably a skin and/or eye care composition, a makeup removal product, a lotion or other cosmetic composition that can have a biphasic form.

The cover 14 is able to be assembled in a removable manner on the neck 26 of the recipient 12 in such a way as to close the upper opening 28. The cover 14 has for example a substantially cylindrical shape and includes a tapping 36 able to cooperate with the threading 31.

The insert 16 is preferably made from a material that has a rigidity that is less than that of the receptacle 12. More precisely, the insert 16 is preferably elastically deformable, at least in bending and/or in torsion. The insert 16 is for example made from a polymer material of the polyketone (PK) type, particularly suited to the oily phase and its components of the biphasic fluid cosmetic composition.

The insert 16 includes a tip 40 and a mixing member 42, adjacent along a second axis 44. Preferably, the tip 40 and the mixing member 42 are formed from one piece.

Figure 3:
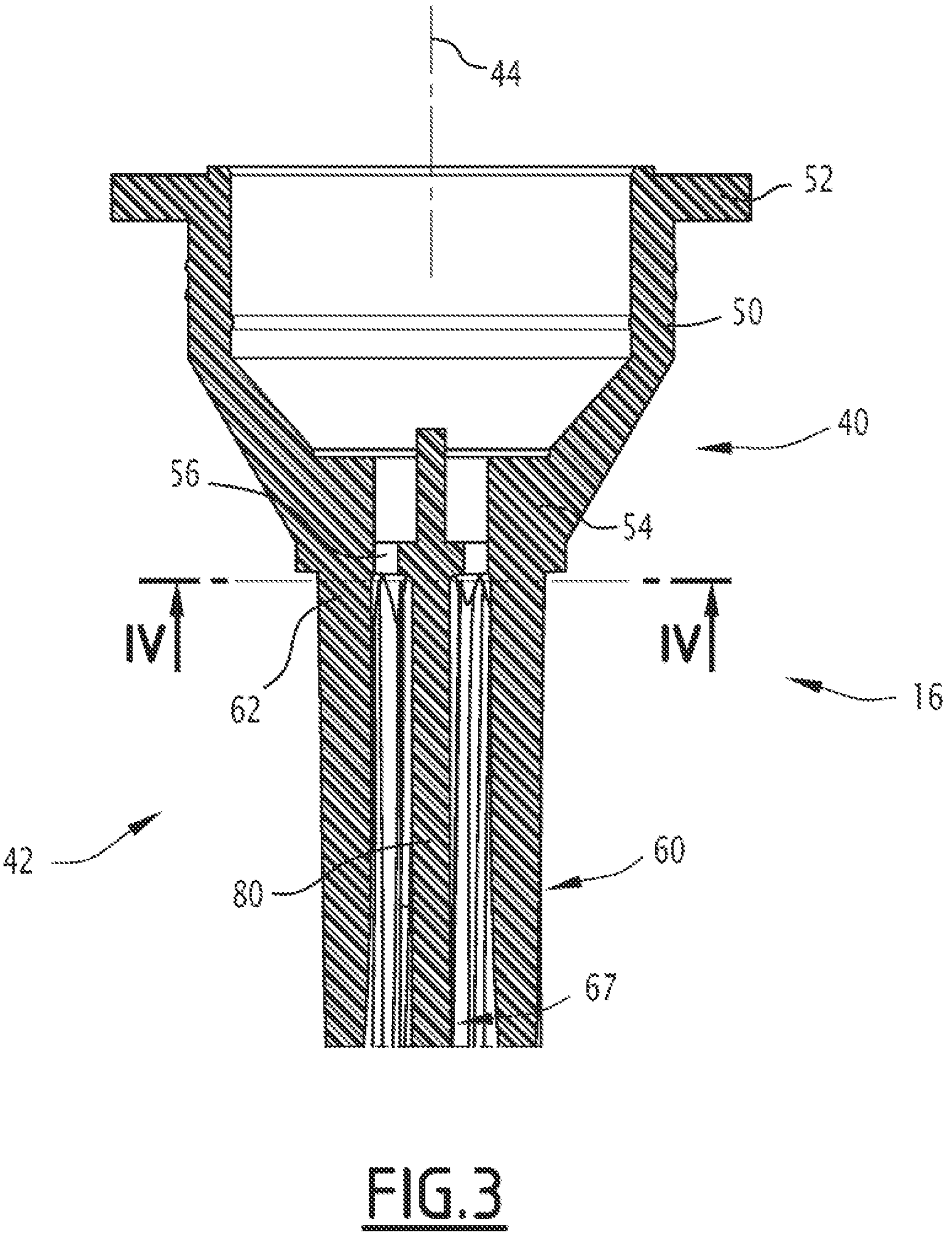
FIG. 3 is a detailed view, as a longitudinal cross-section, of the mixing member of the device of FIGS. 1 and 2.
Figure 4:
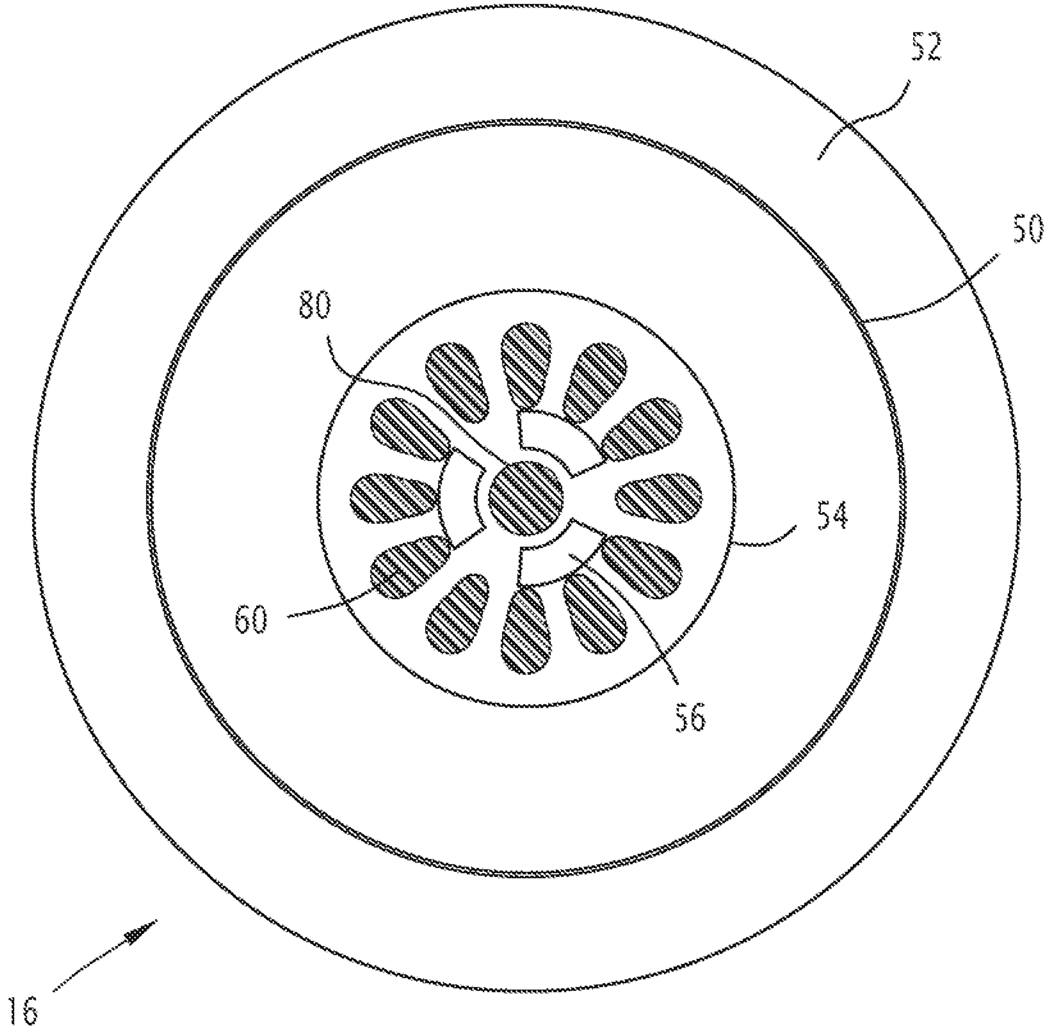
FIG. 4 is a transverse cross-section view of the mixing member of FIG. 3.

The tip 40, also visible in FIGS. 3 and 4, includes a ring 50, a ring 52 and a reducing washer 54.

The ring 50 has a substantially cylindrical of revolution shape, of which one outer diameter is substantially equal to the inner diameter 29 of the neck 26 of the receptacle 12. The ring 52 forms a radial projection around a first axial end of the ring 50.

As can be seen in FIG. 1, the ring 50 is inserted into the neck 26 of the receptacle 12, in such a way that the first 20 and second 44 axes are confounded. The ring 52 forms an axial abutment against an upper end of the neck 26. The insert 16 thus assembled to the receptacle 12 is fixed in rotation about the first 20 and second 44 axes with respect to said receptacle.

A second axial end of the ring 50 is adjacent to the reducing washer 54. Said washer 54 has for function to form a passage of reduced size between the internal volume 30 of the receptacle 12 and the outside of the device 10.

More precisely, the washer 54 closes the second end of the ring 50, except for at least one through-orifice 56 formed in said washer. A maximum dimension of said through-orifice 56, in a plane perpendicular to the second axis 44, is preferably less than or equal to 50%, more preferably less than or equal to 25%, of the inner diameter 29 of the neck 26.

As can be seen in FIG. 4, in the embodiment shown, the washer 54 includes three separate through-orifices 56, regularly distributed at an angle about the second axis 44.

Advantageously, the insert 16, calibrates the dose of the formula delivered during the turning over of the bottle by means of the through orifice or through-orifices 56 provided in the washer 54 of the ring 50. In particular, the washer 54 comprises three through-orifices 56 each having a cross-section comprised between 2 $mm^2$ and 5 $mm^2$, and preferably close to 3.3 $mm^2$.

The mixing member 42 of the insert 16 is adjacent to the washer 54 and received in the internal volume 30 of the receptacle 12.

The mixing member 42 extends in the internal volume 30 over a height 58, measured along the second axis 44. The height 58 is preferably greater than or equal to 50%, more preferably greater than or equal to 75%, and in particular close to 80%, of the height 34 of the internal volume 30.

The mixing member 42 includes a plurality of filaments 60 extending in the internal volume 30. A first end 62 of each one of said filaments 60 is integral with the washer 54, on the side opposite the ring 50. In the embodiment shown, as can be seen in FIG. 4, the first ends 62 of the filaments 60 are disposed around through-orifices 56.

Each filament 60 has an elongated shape, extending between the first 62 and a second 64 ends. The term "elongated shape" means that between the first 62 and second 64 ends of each filament 60, a maximum dimension of each cross-section of the filament 60 is less than 10%, preferably less than 5% of a length of said filament between said first 62 and second 64 ends.

The filaments 60 are separated from each other by a non-zero distance over at least one portion of the height 58 of the mixing member 42, said portion representing at least 50% of the height 34 of the internal volume 30.

Preferably, the mixing member 42 comprises least five filaments 60 and more preferably between 6 and 20 filaments.

Figure 2:
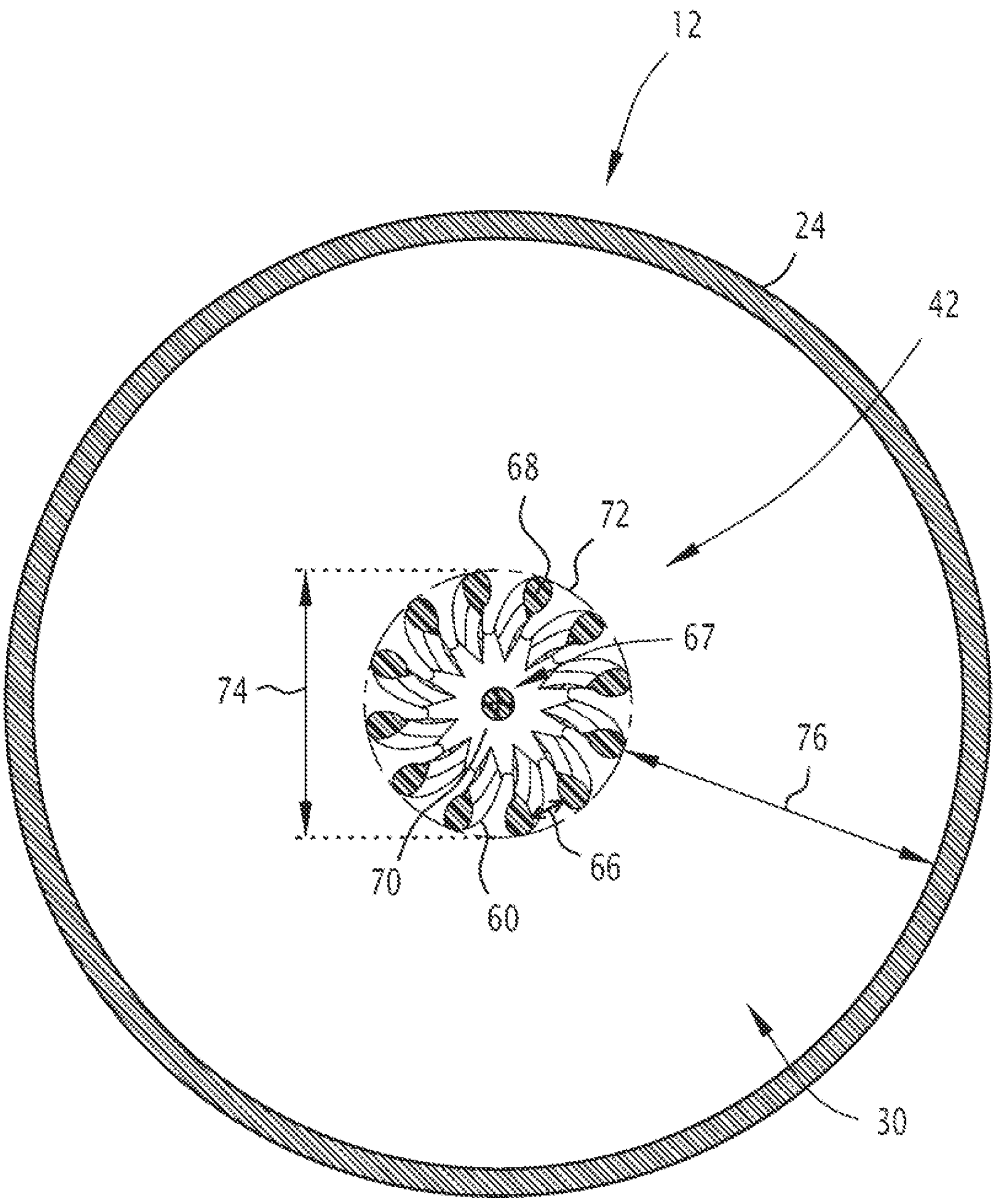
FIG. 2 is a transverse cross-section view of the device of FIG. 1.

In the embodiment shown, as can be seen in FIG. 2, the mixing member 42 comprises twelve substantially identical filaments 60, regularly distributed at an angle around said second axis 44. Two angularly adjacent filaments 60 are separated by a non-zero distance 66 between the first 62 and second 64 ends. The filaments 60 thus surround a central space 67 centered on said second axis 44.

In a plane perpendicular to the second axis 44, a section 68 of each filament 60 preferably has a substantially oval shape, a maximum dimension of said oval being radially oriented with respect to said second axis 44. This form, more preferably, the section 68 has a substantially ovoid profile, one most tapered end of said profile being oriented towards the second axis 44.

Preferably, each filament 60 has a substantially helical winding around the second axis 44. In particular, for each filament 60, the second end 64 is angularly offset around the second axis 44 with respect to the first end 62 by an angle comprised between 20° and 50°, and in particular close to 35°.

According to an embodiment not shown, the second ends of the filaments are free. In the embodiment shown, the mixing member further includes a head 70 substantially disposed on the second axis 44. The second end 64 of each of the filaments 60 is integral with said head 70.

Preferably, the head 70 substantially has the shape of an ogive that points in the direction of the bottom 22 of the receptacle 12.

The filaments 60 define an envelope surface 72 of revolution about the second axis 44. Said envelope surface 72 has a rounded shape, widening from the first end 62 to a maximum diameter 74, then narrows to the second ends 64.

Preferably, in a plane perpendicular to the first axis 20, a minimum distance 76 between the envelope surface 72 and the side wall 24 of the receptacle is greater than or equal to 10 mm. Preferably, said minimum distance 76 is greater than or equal to 10%, more preferably greater than or equal to 20%, of a transversal dimension of the internal volume 30 at said minimum distance.

Preferably, the distance 66 between two adjacent filaments 60 reaches a maximum value between the first 62 and second 64 ends, said maximum value being less than or equal to 5 mm, and in particular close to 2 mm.

In the embodiment shown, the mixing member 42 further includes a mast 80 extending in the central space 67, between the washer 54 and the head 70. The mast 80 is substantially straight and disposed along the second axis 44. In the embodiment shown, as can be seen in FIG. 4, the through-orifices 56 of the washer 54 are disposed around the mast 80. The central mast 80 of the mixing member 42 makes it possible in particular to rigidify, in particular in bending, the mixing member 42, so that the latter remains well centered inside the receptacle 12 that it equips during the stirring of the latter. Moreover, this mast 80, disposed in the central space 67 defined by the filaments 60, makes it possible to further favor the emulsion of the phases of the biphasic fluid cosmetic composition.

According to an alternative not shown, the mixing member 42 is devoid of a mast. The presence or not of said mast makes it possible in particular to modify a rigidity of the mixing member.

Preferably, the mixing member 42 is configured to be able to be inserted into the receptacle 12 by the neck 26. If the maximum diameter 74 is greater than the inner diameter 29 of said neck, the filaments 60 are able to be deformed elastically during the insertion, in particular in the radial direction. The receptacle 12 can be made in a single-block way from a rigid material such as glass.

A method for using the packaging and application device 10 will now be described.

In an initial state, the cover 14 closes the neck 26 of the receptacle 12 and the internal volume 30 receives a quantity of biphasic fluid cosmetic composition, such as described hereinabove.

A user takes hold of the receptacle 12 and applies to it a shaking movement substantially directed along the first axis 20. The cosmetic composition is therefore shaken inside the internal volume 30 and is displaced between the filaments 60 of the mixing member 42. In particular, the cosmetic composition passes successively from the inside to the outside of the central space 67 located in the middle of said filaments 60.

The repeated passages between the filaments 60 exert a shearing on the cosmetic composition, favoring the formation of an intimate emulsion of the two phases of said composition. The mast 80 provided within the internal space 67 defined by the filaments 60 advantageously makes it possible to reinforce this phenomenon of shearing of the phases of the biphasic cosmetic composition favoring the intimate emulsion thereof.

The user views the state of the cosmetic composition through the side wall 24 of the receptacle 12. When a satisfactory emulsion has been obtained, the user unscrews the cover 14 and pours into their hand a dose of cosmetic composition. The size of the through-orifices 56 of the tip 40 is configured to limit the flow rate of the composition in order to improve the control of the dose poured.

Even if the phases of the cosmetic composition separate after a time left idle, the user can easily reconstitute the emulsion before using said composition.

In particular, the device 10 described hereinabove makes it possible to obtain an intimate mixture of the two phases of the cosmetic composition, after fewer shaking cycles that the receptacle 12 without a mixing member 42 would allow.

The invention claimed is:

1. Packaging and application device for a biphasic fluid cosmetic composition, including:

- a receptacle extending along a main axis and defining an internal volume able to receive the cosmetic composition, the receptacle comprising a neck disposed on the main axis and giving access to the internal volume; and
- a mixing member, received in the internal volume of the receptacle;
- the mixing member including a plurality of extended filaments, a first end of each one of the filaments is connected to the neck of the receptacle, with the filaments being separated from each other by a non-zero distance over at least 50% of a height of the internal volume from the neck; and
- the mixing member being fixed in rotation with respect to the receptacle;
- the device further comprising a tip inserted into the neck of the receptacle, the first end of each one of the filaments of the mixing member being integral the tip, the tip comprising at least one through-orifice giving access to the internal volume of the receptacle;
- wherein the mixing member further includes a head disposed on the main axis, a second end of each of the filaments being integral with the head; and
- wherein the mixing member further includes a straight mast, connecting the head to the neck of the receptacle, the filaments being disposed around the mast.

2. The packaging and application device according to claim 1, wherein the plurality of filaments comprises at least five filaments.

3. The packaging and application device according to claim 2, wherein each filament has a helical winding about the main axis.

4. The packaging and application device according to claim 2, wherein, in a plane perpendicular to the main axis, a section of at list one filament has a substantially an oval shape, a maximum dimension of said oval being oriented radially.

5. Packaging and application device according to claim 2, wherein the plurality of filaments is between 6 and 20 filaments.

6. The packaging and application device according to claim 1, wherein each filament has a helical winding about the main axis.

7. The packaging and application device according to claim 6, wherein, in a plane perpendicular to the main axis, a section of at list one filament has an oval shape, a maximum dimension of said oval being oriented radially.

8. The packaging and application device according to claim 1, wherein the filaments define an envelope surface about the main axis, such that an intersection of said envelope surface with a plane passing through the main axis has a rounded profile.

9. The packaging and application device according to claim 8, wherein, in a plane perpendicular to the main axis, a section of at list one filament has an oval shape, a maximum dimension of said oval being oriented radially.

10. The packaging and application device according to claim 8, wherein, in a plane perpendicular to the main axis, a minimum distance between the envelope surface and the receptacle is greater than or equal to 10 mm.

11. The packaging and application device according to claim 1, wherein, in a plane perpendicular to the main axis, a of at list one filament has an oval shape, a maximum dimension of said oval being oriented radially.

12. The packaging and application device according to claim 1, wherein the first ends of the filaments are disposed around the through-orifice or through-orifices.

13. The packaging and application device according to claim 1, further comprising a biphasic fluid cosmetic composition received in the inner chamber internal volume of the receptable.

14. The packaging and application device according to claim 13, wherein the biphasic fluid cosmetic composition includes an aqueous phase and an organic phase, the aqueous phase representing between 50% and 99% by mass of said biphasic fluid cosmetic composition.

* * * * *